(12) United States Patent
Tanimura et al.

(10) Patent No.: US 10,411,269 B2
(45) Date of Patent: Sep. 10, 2019

(54) GAS DIFFUSION ELECTRODE SUBSTRATE, AND MEMBRANE ELECTRODE ASSEMBLY AND FUEL CELL PROVIDED THEREWITH

(71) Applicant: TORAY INDUSTRIES, INC., Tokyo (JP)

(72) Inventors: Yasuaki Tanimura, Otsu (JP); Masamichi Utsunomiya, Otsu (JP); Toshiya Kamae, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 273 days.

(21) Appl. No.: 15/119,314

(22) PCT Filed: Feb. 17, 2015

(86) PCT No.: PCT/JP2015/054194
§ 371 (c)(1),
(2) Date: Aug. 16, 2016

(87) PCT Pub. No.: WO2015/125748
PCT Pub. Date: Aug. 27, 2015

(65) Prior Publication Data
US 2017/0012291 A1    Jan. 12, 2017

(30) Foreign Application Priority Data

Feb. 24, 2014   (JP) .................... 2014-032828

(51) Int. Cl.
*H01M 8/0245*   (2016.01)
*H01M 8/0234*   (2016.01)
(Continued)

(52) U.S. Cl.
CPC ....... *H01M 8/0245* (2013.01); *H01M 4/8605* (2013.01); *H01M 4/8631* (2013.01);
(Continued)

(58) Field of Classification Search
None
See application file for complete search history.

(56) References Cited

U.S. PATENT DOCUMENTS

| | | | |
|---|---|---|---|
| 2002/0098407 A1 | 7/2002 | Kunisa et al. | |
| 2012/0156587 A1* | 6/2012 | Akasaka | H01M 4/861 |
| | | | 429/480 |

(Continued)

FOREIGN PATENT DOCUMENTS

| | | |
|---|---|---|
| JP | 2010-232062 A | 10/2010 |
| JP | 2011-216375 A | 10/2011 |
| WO | WO 01/22510 A1 | 3/2001 |

OTHER PUBLICATIONS

International Search Report issued in PCT/JP2015/054194, dated May 19, 2015.
(Continued)

*Primary Examiner* — Sin J Lee
(74) *Attorney, Agent, or Firm* — Birch, Stewart, Kolasch & Birch, LLP

(57) ABSTRACT

A gas diffusion electrode substrate that is used in a fuel cell and is constituted by an electrode substrate and microporous parts, in which a microporous part (A) is formed on one surface of the electrode substrate, and a microporous part (B) is formed in a part of the inside of the electrode substrate, the gas diffusion electrode substrate having a part in which the microporous part (B) is continuously present from the electrode substrate surface on the side on which the microporous part (A) is formed to a position near the electrode substrate surface on the opposite side, and a part in which pores are continuously distributed from the electrode substrate surface on the side on which the microporous part A is formed to the electrode substrate surface on the opposite side.

20 Claims, 1 Drawing Sheet

(51) Int. Cl.
*H01M 8/0239* (2016.01)
*H01M 8/1004* (2016.01)
*H01M 4/86* (2006.01)
*H01M 4/96* (2006.01)
*H01M 8/1018* (2016.01)

(52) U.S. Cl.
CPC ........... *H01M 4/96* (2013.01); *H01M 8/0234* (2013.01); *H01M 8/0239* (2013.01); *H01M 8/1004* (2013.01); *H01M 2004/8694* (2013.01); *H01M 2008/1095* (2013.01)

(56) References Cited

U.S. PATENT DOCUMENTS

2013/0029247 A1   1/2013   Takami et al.
2017/0012297 A1*  1/2017   Tanimura ............ H01M 8/0234

OTHER PUBLICATIONS

Written Opinion of the International Searching Authority issued in PCT/JP2015/054194 (PCT/ISA/237), dated May 19, 2015.

* cited by examiner

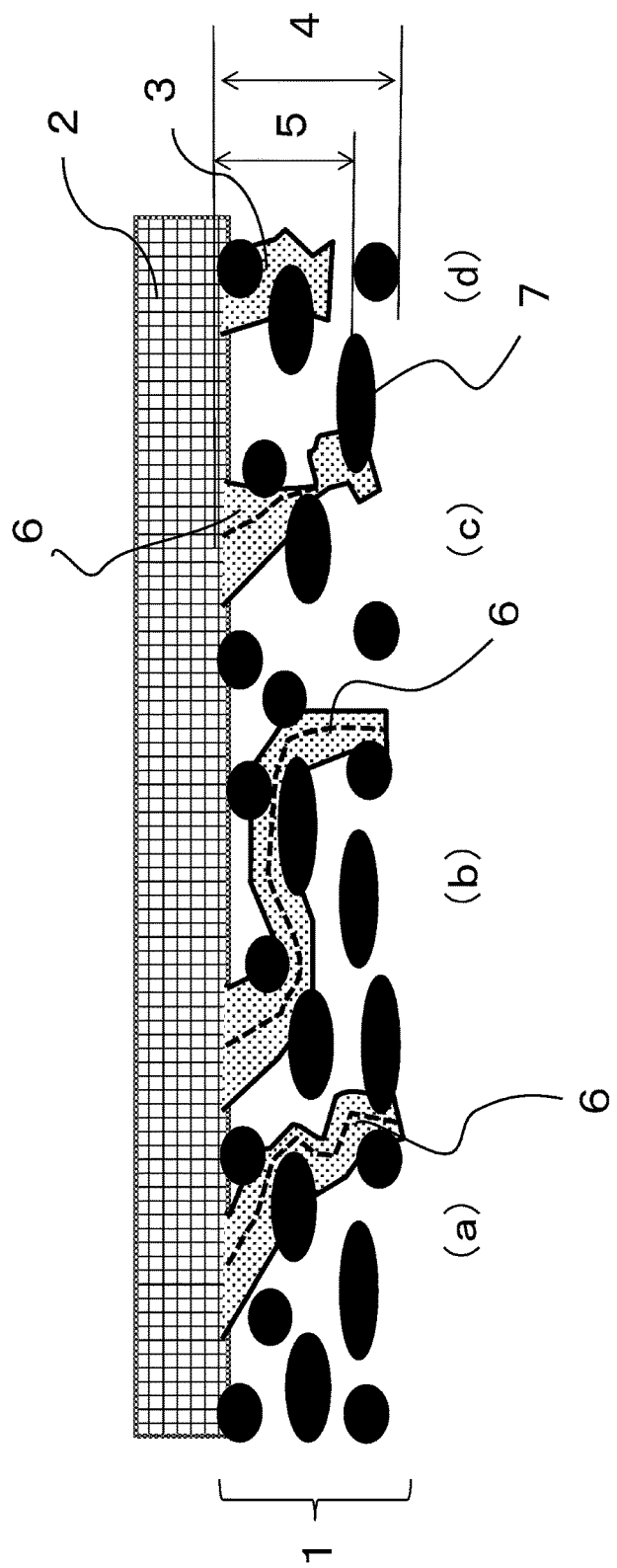

GAS DIFFUSION ELECTRODE SUBSTRATE, AND MEMBRANE ELECTRODE ASSEMBLY AND FUEL CELL PROVIDED THEREWITH

TECHNICAL FIELD

The present invention relates to a gas diffusion electrode substrate which is suitably used for a fuel cell, particularly for a polymer electrolyte fuel cell. More specifically, the present invention relates to a gas diffusion electrode substrate which is excellent in its anti-flooding characteristic, since gas diffusivity and water removal performance are good even in the conditions of low temperature and high humidity, while having anti-dry-out characteristic at high temperatures, and is capable of exhibiting high fuel cell performance across a wide temperature range from low to high temperatures while maintaining mechanical properties, electrical conductivity and thermal conductivity.

BACKGROUND ART

A polymer electrolyte fuel cell in which a hydrogen-containing fuel gas and oxygen-containing oxidizing gas are supplied to an anode and cathode, respectively, and an electromotive force is generated by an electrochemical reaction occurring at both poles is generally constituted by sequentially laminating a bipolar plate, a gas diffusion electrode substrate, a catalyst layer, an electrolyte membrane, a catalyst layer, a gas diffusion electrode substrate, and a bipolar plate. The gas diffusion electrode substrate is required to have high gas diffusivity for allowing a gas supplied from the bipolar plate to be diffused into the catalyst layer and high water removal performance for discharging liquid water generated by the electrochemical reaction to the bipolar plate, as well as high electrical conductivity for extracting generated electric current, and gas diffusion electrode substrates composed of carbon fibers and the like are widely used.

However, the following problems are known: (1) when the polymer electrolyte fuel cell is operated at a relatively low temperature of below 70° C. in a high current density region, as a result of blockage of the electrode substrate by liquid water generated in a large amount and shortage in the fuel gas supply, the fuel cell performance is impaired (this problem is hereinafter referred to as "flooding") ; and (2) when the polymer electrolyte fuel cell is operated at a relatively high temperature of 80° C. or higher, as a result of drying of the electrolyte membrane due to water vapor diffusion and a reduction in the protonic conductivity, the fuel cell performance is impaired (this problem is hereinafter referred to as "dry-out"). In order to solve these problems of (1) to (2), various efforts have been made. A method of improving gas diffusivity and water removal performance by forming a microporous part on the surface of the gas diffusion electrode substrate, and forming pores in the microporous part is the basic solution to these problems.

Patent Document 1 discloses that stable fuel cell performance can be obtained in a low humidity condition and high humidity condition by having a structure in which a carbon porous material, i.e., a microporous part, is impregnated in an electrode substrate, and the density of the impregnated layer is set to a predetermined range. However, by the structure in which a microporous part is impregnated in an electrode substrate, obtained by the above method, high gas diffusivity and high water removal performance cannot be simultaneously satisfied, and particularly, fuel cell performance has been insufficient at low temperatures.

Patent Document 2 discloses a technology to form a through hole by putting a large quantity of pore-forming particles into the inside of the microporous part, and obtaining high performance in the drying conditions and humidified conditions by separating the paths of water and gas. However, while water removal performance is improved by the microporous part in the method disclosed in Patent Document 2, there is a problem that discharged water accumulates in carbon paper and inhibits diffusion of gas, and sufficient properties could not be obtained.

As described above, a variety of efforts have been made; however, one that can be satisfied as a gas diffusion electrode substrate which has excellent anti-flooding characteristic particularly at low temperatures without deteriorating anti-dry-out characteristic is yet to be discovered.

PRIOR ART DOCUMENTS

Patent Documents

Patent Document 1: Japanese Patent Laid-open Publication No. 2009-129599
Patent Document 2: Japanese Patent Laid-open Publication No. 2008-277093

SUMMARY OF THE INVENTION

Problems to be Solved by the Invention

An object of the present invention is to provide a gas diffusion electrode substrate which is excellent in its anti-flooding characteristic, since gas diffusivity and water removal performance are good, even in the conditions of low temperature and high humidity, while having anti-dry-out characteristic at high temperatures, and is capable of exhibiting high fuel cell performance across a wide temperature ranging from low to high temperatures, without greatly impairing mechanical properties, electrical conductivity and thermal conductivity, and to provide a membrane electrode assembly, and a fuel cell.

Solutions to the Problems

In the gas diffusion electrode substrate of the present invention, the following means is adopted in order to solve the above problems. That is, the gas diffusion electrode substrate of the present invention is a gas diffusion electrode substrate that is used in a fuel cell and is constituted by an electrode substrate and microporous parts, in which a microporous part (A) is formed on one surface of the electrode substrate, and a microporous part (B) is formed in a part of the inside of the electrode substrate, the gas diffusion electrode substrate having a part in which the microporous part (B) is continuously present from the electrode substrate surface on the side on which the microporous part (A) is formed to a position near the electrode substrate surface on the opposite side, and a part in which pores are continuously distributed from the electrode substrate surface on the side on which the microporous part (A) is formed to the electrode substrate surface on the opposite side.

Also, in the membrane electrode assembly of the present invention, the following means is adopted in order to solve the above problems. That is, the membrane electrode assembly of the present invention is a membrane electrode assembly having catalyst layers on both sides of the electrolyte membrane, and further having the gas diffusion electrode substrate on the outer side of the catalyst layers.

Furthermore, in the fuel cell of the present invention, the following means is adopted in order to solve the above problems. That is, the fuel cell of the present invention is a fuel cell having bipolar plates on both sides of the membrane electrode assembly.

EFFECTS OF THE INVENTION

According to the present invention, discharge of liquid water is promoted, while having anti-dry-out characteristic in power generation at high temperatures and maintaining gas diffusivity of the gas diffusion electrode substrate, whereby flooding in power generation at low temperatures can be greatly suppressed. Therefore, when the gas diffusion electrode substrate of the present invention is used in a fuel cell, it is possible to exhibit high fuel cell performance across a wide temperature range from low to high temperatures. Also, the gas diffusion electrode substrate of the present invention has good mechanical strength, electrical conductivity, and thermal conductivity.

BRIEF DESCRIPTION OF THE DRAWINGS

FIG. 1 is a cross-sectional schematic view of a gas diffusion electrode substrate showing the state that a microporous part is formed on the electrode substrate.

MODE FOR CARRYING OUT THE INVENTION

Considering that both gas diffusivity in the through-plane direction of an electrode substrate and water removal performance from an electrode substrate to a bipolar plate flow channel cannot be satisfied by a conventional method, and thus performance cannot be improved, the present inventors have found that discharge of liquid water can be promoted while keeping gas diffusivity, by a structure in which a path that contributes to gas diffusivity and a path that contributes to water removal performance are separated, thereby achieving the present invention.

It is necessary that the gas diffusion electrode substrate of the present invention is constituted by an electrode substrate and microporous parts, and a microporous part (A) is formed on one surface of the electrode substrate, and a microporous part (B) is formed in a part of the inside of the electrode substrate. The microporous part (A) is a microporous part laminated in a layer state on the surface of the electrode substrate, and distinguished from the microporous part (B) described below that is a microporous part formed in a part of the inside of the electrode substrate.

It is noted herein that in the present invention, a substrate consisting of only a carbon paper or the like without any microporous parts being formed thereon, or a portion thereof in the "gas diffusion electrode substrate" is referred to as "electrode substrate", and a substrate on which a microporous part is formed is referred to as "gas diffusion electrode substrate".

Each element will be described below.

The electrode substrate in the present invention is required to have high gas diffusivity for allowing a gas supplied from the bipolar plate to be diffused into the catalyst layer and high water removal performance for discharging liquid water generated by the electrochemical reaction to the bipolar plate, as well as high electrical conductivity for extracting generated electric current.

Therefore, as the electrode substrate, an electrically conductive porous material, specifically, a porous material such as carbon fiber woven fabric, carbon fiber non-woven fabric or carbon fiber papermaking substrate, or a metal porous material such as sinter foamed metal, metal mesh or expanded metal is used. Among them, a carbon fiber-containing porous material is preferably used because of its excellent corrosion resistance. As the carbon fiber woven fabric, a woven fabric obtained by weaving carbon fiber or a woven fabric obtained by baking woven fabric obtained by weaving precursor fiber of carbon fiber may be used. Also, as the carbon fiber non-woven fabric, a non-woven fabric obtained by processing carbon fiber to a non-woven fabric or a so-called felt-type non-woven fabric obtained by applying processing such as compression to a non-woven fabric obtained by processing precursor fiber of carbon fiber to a non-woven fabric, as necessary, and then baking the resultant may be used. Among carbon fiber-containing porous materials, it is particularly preferred to use a substrate on which a carbon fiber papermaking substrate is bonded with carbide, namely a "carbon paper", because of its excellent mechanical strength. In the present invention, as described below, a substrate on which a carbon fiber papermaking substrate is bonded with carbide can be normally obtained by impregnating a carbon fiber papermaking substrate with a resin and then carbonizing the resultant. Examples of the carbon fiber include polyacrylonitrile (PAN)-based, pitch-based and rayon-based carbon fibers. Among them, in the present invention, a PAN-based or pitch-based carbon fiber is preferably used because of its excellent mechanical strength.

The thickness of the electrode substrate is preferably 50 µm or more, and more preferably 60 µm or more. Also, the thickness of the electrode substrate is preferably 190 µm or less, and more preferably 160 µm or less. The thickness of the electrode substrate is set to 190 µm or less, whereby, when impregnating the microporous part (B), it is easily impregnated into the inside of the electrode substrate, and a part in which the microporous part (B) is continuously present from the electrode substrate surface on the side on which the microporous part (A) is formed to the electrode substrate surface on the opposite side, that is required in the present invention, i.e., the structure in which the microporous part (B) is continuously present can be efficiently formed. Meanwhile, when the thickness of the electrode substrate is set to 50 µm or more, a gas is diffused in the substrate in the in-plane direction to below ribs of the bipolar plate, thus a gas is likely to diffuse to a catalyst layer below ribs, thereby contributing to improvement in fuel cell performance. The thickness of the electrode substrate can be determined using a micrometer under a condition where the electrode substrate is compressed at a pressure of 0.15 MPa. The individual measured values at 10 points are averaged, and the obtained value is defined as the thickness. Here, the thickness of the electrode substrate may be measured using an electrode substrate separated from the gas diffusion electrode substrate. For example, a gas diffusion electrode substrate is heated in an air at 600° C. for 30 minutes, a water repellent agent and the like contained in the microporous part in the gas diffusion electrode substrate are oxidatively decomposed, then ultrasonic treatment is carried out in a solvent such as ethanol, whereby a residue of the microporous part can be removed and the electrode substrate can be taken out, and the thickness may be measured in the same manner as above, using the above electrode substrate. Also, the thickness of the substrate in which the microporous part (A) present on its surface is peeled from the gas diffusion electrode substrate may be defined as the thickness of the electrode substrate. Hereinafter, the substrate in which the microporous part (A) present on its surface is peeled from the gas diffusion electrode substrate is sometimes called as the electrode substrate part. For example, an adhesive tape such as "Scotch" (registered trademark) tape #810 (manufactured by 3M) is adhered on the microporous part (A) side of the gas diffusion electrode substrate surface at a pressure of 0.15 MPa. Adhesion and peeling are repeated, and it can be defined that the microporous part (A) can be peeled at the point where mass reduction due to peeling by the adhesive tape is 1% by mass or less, and thus the electrode substrate part can be obtained. The thickness measured by the above-described method for the electrode substrate part can be defined as the thickness of the electrode substrate.

In the present invention, the bulk density of the electrode substrate is preferably 0.2 g/cm$^3$ or more, more preferably 0.22 g/cm$^3$ or more, and further preferably 0.24 g/cm$^3$. Also, the bulk density of the electrode substrate is preferably 0.4 g/cm$^3$ or less, more preferably 0.35 g/cm$^3$ or less, and further preferably 0.3 g/cm$^3$ or less. When the bulk density is 0.2 g/cm$^3$ or more, the water vapor diffusivity is small, so that dry-out can be further suppressed. Therefore, the mechanical properties of the electrode substrate are improved, thus an electrolyte membrane and a catalyst layer can be adequately supported thereon. Furthermore, high electrical conductivity is attained, and the fuel cell performance is thus improved at both high and low temperatures. Meanwhile, when the bulk density is 0.4 g/cm$^3$ or less, the water removal performance is improved, and flooding can thus be further suppressed.

The method for measuring the bulk density of the electrode substrate can be obtained by cutting out 2-cm square of the electrode substrate as a test piece, measuring its mass, and dividing the mass by a volume that is a product of the thickness of the electrode substrate obtained by the above method and the cut out area (4 cm$^2$) of the test piece. Five samples are measured, and the average thereof is defined as the bulk density of the electrode substrate. As the test piece to be measured, an electrode substrate separated from the gas diffusion electrode substrate as described above may be used.

In the electrode substrate used in the present invention, as compared to the surface roughness on the side where the microporous part (A) is formed, the surface roughness on the opposite side is preferably larger with a difference of 1 μm or more, more preferably larger with a difference of 2 μm or more, and further preferably larger with a difference of 2.5 μm or more. When there is a certain difference in the surface roughness between both sides of the electrode substrate, a flow is generated in the through-plane direction of the electrode substrate when the microporous part (B) is impregnated, and a structure in which the microporous part (B) is continuous in the through-plane direction is likely to be formed. Meanwhile, the difference in the surface roughness is preferably 5 μm or less, more preferably 4.5 μm or less, and further preferably 4 μm or less. The difference in the surface roughness is not made too large, whereby the microporous part (B) generates deviation in the through-plane direction, and the loading amount on one electrode substrate surface can be prevented from becoming too large, thus the structure continuous in the through-plane direction can be formed. Here, the surface roughness of the electrode substrate can be obtained by measuring the range of 5 mm square in the surface of the electrode substrate using a laser microscope or the like, and performing plane tilt correction, then calculating the arithmetic average roughness Ra [μm] on the surface.

In the present invention, it is necessary that, in the gas diffusion electrode substrate, a microporous part (A) is formed on one surface of the electrode substrate. The microporous part (A) is required to have high gas diffusivity for allowing a gas supplied from the bipolar plate to be diffused into the catalyst layer and high water removal performance for discharging liquid water generated by the electrochemical reaction to the bipolar plate, as well as high electrical conductivity for extracting generated electric current. Furthermore, the microporous part (A) has functions of promoting back-diffusion of water to an electrolyte membrane, and wetting the electrolyte membrane. The thickness of the microporous part (A) is preferably 10 μm or more, and more preferably 15 μm or more. Also, the thickness of the microporous part (A) is preferably 60 μm or less, and more preferably 35 μm or less. The thickness of the microporous part (A) is set to 10 μm or more, whereby the electrode substrate can be isolated from the catalyst layer, thus durability of the electrolyte membrane can be improved. Meanwhile, the thickness of the microporous part (A) is set to 60 μm or less, whereby water of a liquid generated from the catalyst layer and condensed is allowed to permeate the electrode substrate, and water removal performance inside the electrode substrate can be further improved.

Here, the thickness of the microporous part (A) can be obtained by subtracting the thickness of the electrode substrate from the thickness of the gas diffusion electrode substrate. The thickness of the gas diffusion electrode substrate can be determined using a micrometer under a condition where the electrode substrate is compressed at a pressure of 0.15 MPa, as same as the thickness of the electrode substrate, and the individual measured values at 10 points are averaged, and the obtained value is defined as the thickness.

In the present invention, the areal weight of the microporous part (A) is preferably 5 g/m$^2$ or more, more preferably 10 g/m$^2$ or more, and further preferably 12 g/m$^2$ or more. Also, the areal weight of the microporous part (A) is preferably 35 g/m$^2$ or less, more preferably 30 g/m$^2$ or less, and further preferably 25 g/m$^2$ or less. In the present invention, the areal weight means a mass per unit area. When the areal weight of the microporous part (A) is 5 g/m$^2$ or more, the electrode substrate surface can be covered, durability of the electrolyte membrane can be improved, and also back-diffusion of water vapor generated in a cathode to an anode, and dry-out can be further suppressed. Also, when the areal weight of the microporous part (A) is 35 g/m$^2$ or less, the water removal performance is further improved and flooding can be further suppressed.

Here, the areal weight of the microporous part (A) can be determined by subtracting the areal weight of the electrode substrate part from the areal weight of the gas diffusion electrode substrate. The areal weight of the gas diffusion electrode substrate and the areal weight of the electrode substrate part can be determined by cutting out a 10-cm square of the substrate as a test piece, and dividing the mass of the test piece by the area (0.01 m$^2$) of the test piece. The electrode substrate part can be taken out from the gas diffusion electrode substrate by the method described above for the measurement of the thickness of the electrode substrate.

Also, the areal weight of the microporous part (A) may be determined by subtracting the areal weight of the microporous part (B) from the areal weight of the whole microporous part. The areal weight of the whole microporous part may be determined by subtracting the areal weight of the electrode substrate from the areal weight of the gas diffusion electrode substrate. The areal weight of the microporous part (B) may be determined by subtracting the areal weight of the electrode substrate from the areal weight of the electrode substrate in which the microporous part (B) is impregnated, before applying a carbon coating solution of the microporous part (A), or may be determined by subtracting the areal weight of the electrode substrate from the areal weight of the electrode substrate part taken out from the gas diffusion electrode substrate by the method described above for the measurement of the thickness of the electrode substrate.

In the present invention, it is necessary that a microporous part (B) is formed in a part of the inside of the electrode substrate. The microporous part (B) is usually impregnated in the part of the inside of the electrode substrate. A cross-sectional schematic view of a gas diffusion electrode substrate that is an example of the present invention is shown in FIG. 1. Here, a microporous part (A) 2 is formed on one side of an electrode substrate 1, and a microporous part (B) is formed by impregnating in a part of the inside of the electrode substrate 1 continuous to the microporous part (A) 2. It is important to have a part in which the microporous part (B) 3 is continuously present from one surface of the electrode substrate 1 on the side on which the microporous part (A) 2 is formed to a position near the surface on the opposite side of the electrode substrate 1, and a part in which pores are continuously distributed from the electrode substrate 1 on the side on which the microporous part (A) 2 is formed to a position near the surface on the opposite side of the electrode substrate 1.

The pores continuously distributed from the electrode substrate surface on the side on which the microporous part (A) is formed to the electrode substrate surface on the opposite side are pores in which the electrode substrate originally has, and have a pore diameter of about 5 μm to 100 μm. Meanwhile, the microporous part is formed originally having many pores, and the pore in which the microporous part originally has is also a continuous pore, has a pore diameter of about several 10 nm to 5 μm, and is distinguished from the pore in which the electrode substrate originally has. Hereinafter, for convenience, the pore in which the electrode substrate originally has is referred to as "large pore", and the pore in which the microporous part originally has is referred to as "small pore".

The microporous part (B) 3 has a small pore of several μm or less. Thus, when the porous material having the small pore contains a water repellent agent, water removal performance is high, and water is pushed out from the small pore to a continuous large pore. Even in power generation at low temperatures, the microporous part (B) 3 itself retains gas diffusivity, and the microporous part (B) having a limited width is continuously present in the through-plane direction, whereby a gas path is formed from one surface to the opposite surface of the electrode substrate, thus gas diffusivity is maintained.

Meanwhile, large pores have a limited width in the through-plane direction and are continuous from the electrode substrate surface on the side on which the microporous part (A) is formed to the electrode substrate surface on the opposite side. Thus, liquid water pushed out from the microporous part (B) to the large pores is discharged outside the gas diffusion electrode substrate through the large pores, and further discharged to a flow channel of the bipolar plate. That is, the large pore is an efficient discharge path of water in the gas diffusion electrode substrate. This is a reason that both gas diffusivity and water removal performance can be satisfied due to the internal structure of the gas diffusion electrode substrate by the present invention, and anti-flooding characteristic can be greatly improved, even in a power generating condition in which a large amount of water is generated at low temperatures. Meanwhile, in a power generation condition at high temperatures, while a large pore has high gas diffusivity, it thus has large water vapor diffusivity, and acts in a direction in which an electrolyte membrane is easily dry-out, the microporous part (B) having small pores has moderate gas diffusivity. Thus, the microporous part (B) that is continuous in the through-plane direction is formed, whereby diffusion of water vapor is suppressed and drying of the electrolyte membrane can be prevented, and anti-dry-out characteristic can be also maintained. To do this, it is important that the microporous part (B) and large pores have a path continued in the through-plane direction.

Here, the through-plane direction means a direction orthogonal to the substrate surface, and the through-plane direction from the microporous part (A) 2 to the opposite side of the electrode substrate 1, and may not be necessarily linearly continued to the opposite side. However, when bending of a path of the continued microporous part (B) or continued large pore becomes large, a path of gas diffusion or water discharge becomes long, thus the bending is desirably small. Also, the term "continue" means that it is continuous with a width of 10 μm or more in the through-plane cross section. By the presence of this width, gas diffuses inside the microporous part (B), and the path can be secured when water is removed through the large pores. Therefore, both high gas diffusivity and high water removal performance can be satisfied, and further higher fuel cell performance can be obtained. For example, in FIG. 1, while the microporous part (B) 6 present in the region of (c) has a narrow part, it is hard to say it is continuous. However, the microporous part (B) 6 present in the region of (a) does not have a narrow part, thus it can be said it is clearly continuous.

Moreover, it is not always necessary that the microporous part (B) is continuously formed from the surface of the side on which the microporous part (A) is formed to the surface of the opposite side, namely, the whole thickness of the electrode substrate, in the inside of the electrode substrate, and the microporous part (B) may be present in a form connecting to the microporous part (A), and may be continuous from the surface of the side on which the microporous part (A) is formed to a position near the surface on the opposite side, in the inside of the electrode substrate. Here, the term "connect" usually refers to microporous parts contact with each other having a width of 10 μm or more. Specifically, as shown in 5 in FIG. 1, the thickness in the through-plane direction of the microporous part (B) with respect to thickness 4 of the electrode substrate may be ¾ or more of the thickness of the electrode substrate in the cross section in the through-plane direction of the electrode substrate. That is, it is preferred that the microporous part (B) is impregnated having a width of 10 μm or more in a depth of ¾ or more of the thickness of the electrode substrate from the electrode substrate surface on the side where the microporous part (A) is formed. For example, in FIG. 1(d), it cannot be said to be continuous when the thickness is less than ¾ in the through-plane direction of the electrode substrate 1. This is because the path of gas is continuous more than a certain thickness in the through-plane direction of the electrode substrate, whereby diffusion of gas or discharge of water can be effectively greatly improved. Accordingly, bending as defined by the value obtained by dividing a path length 6 of the microporous part (B) by the thickness 4 of the electrode substrate in a continuous distribution in the through-plane direction of the microporous part (B) in the inside of the electrode substrate is preferably small, and is desirably 3 or less. For example, bending in FIG. 1(b) is large, thus FIG. 1(a) is desirable. Here, the path length 6 is, in the through-plane direction, a length of connecting a continuous large pore or large pore continuous to the microporous part (B) or a center of the width of the continuous microporous part (B).

It is desirable that the more the part in which the microporous part (B) is continuously present, specifically, the higher the density shown by the number of the parts per a unit length in the cross section, and further, it is desirable that the large pores continuous to the continuous microporous part (B) is present in high density. This is because the continuous microporous part (B) works in diffusing gas from the bipolar plate side to the catalyst layer in contact with the microporous part (A), even in a power generation condition in which a large amount of water is generated at low temperatures, and definite quantity of the microporous part (B) is present in the plane, whereby gas can be efficiently supplied to the microporous part (A). The thickness of the microporous part (A) of the gas diffusion electrode substrate is 10 μm or more and 60 μm or less, and it is desirable that the microporous part (B) continuous in the through-plane direction is present at about 10-times frequency of the in-plane direction as this thickness. Namely, in the cross section of the electrode substrate, the density of the part in which the microporous part (B) is continuously present is preferably 1 part/mm or more, more preferably 1.5 parts/mm or more, and further preferably 2 parts/mm or more. Whereby, efficiencies of gas diffusion and water removal performance can be further improved.

Also, it is preferred that the part in which the large pore is continuously distributed is also present at the same frequency, and namely, in the cross section of the electrode substrate, the density of the part in which the large pore is continuously present is preferably 1 part/mm or more, preferably 1.5 parts/mm or more, and further preferably 2 parts /mm or more. Whereby, efficiencies of gas diffusivity and water removal performance can be further improved. Also, both gas diffusivity and water removal performance can be satisfied in high levels in a power generation condition in the wide range from low temperature to high temperature, and fuel cell performance can be further improved. Here, the density in the cross section of the electrode substrate of the part in which the microporous part (B) is continuously present means the number of the part in which the microporous part (B) is continuously present that is present per a unit length (1 mm) in the longitudinal direction (in-plane direction) of the electrode substrate, in the through-plane cross section of the electrode substrate. Also, the density in the cross section of the electrode substrate of the part in which the large pore is continuously distributed means the number of the pore of the part in which the large pore is continuously distributed that is present per a unit length (1 mm) in the longitudinal direction (in-plane direction) of the electrode substrate, in the through-plane cross section of the electrode substrate. Here, the cross section of the electrode substrate is prepared in the through-plane direction of the gas diffusion electrode substrate, by a method such as ion milling. The above cross section is randomly prepared in 5 or more positions, and the structure of these cross sections are observed using a scanning electron microscope or the like, whereby the cross sectional structure such as various densities can be evaluated.

Here, the microporous part (A) layered on the surface of the electrode substrate and the microporous part (B) formed in the inside of the electrode substrate may have the same composition, or may have a different composition. The microporous part that is formed by impregnating the carbon coating solution used for forming the microporous part (A) soaked in the inside of the electrode substrate corresponds to the microporous part (B).

When the inside of the electrode substrate is formed by excessively impregnating with the microporous part (B), liquid water cannot permeate a hydrophobic small pore of the microporous part (B), and the frequency of the large pores continuous in the through-plane direction to be a water removal path is also decreased, thus water removal performance of the gas diffusion electrode substrate is lowered. At the same time, a carbon porous material having low porosity inhibits gas diffusion, thus gas diffusivity is also low, and the sufficient amount of gas cannot be supplied to the catalyst layer. Therefore, it is necessary to combine the thickness of the electrode substrate with the appropriate areal weight of the microporous part (B), so that the microporous part (B) can be formed in the inside of the electrode substrate, and the areal weight of the microporous part (B) is preferably 0.25 times or more and more preferably 0.3 times or more as the areal weight of the electrode substrate. Also, the areal weight of the microporous part (B) is preferably 0.55 times or less and more preferably 0.5 times or less as the areal weight of the electrode substrate. The above areal weight amount is preferred, because the areal weight amount is set in the above range, whereby the microporous part (B) having a continuous structure in the through-plane direction and a large pore continuous in the through-plane direction can be obtained, and the electrode substrate can have high gas diffusivity and water removal performance in the through-plane direction. The ratio of the areal weight of the microporous part (B) to the areal weight of the electrode substrate is set to 0.25 times or more, whereby a structure in which the microporous part (B) is continuously present from the electrode substrate surface on the side on which the microporous part (A) to the electrode substrate surface on the opposite side can be efficiently formed, that is required in the present invention, and a gas path can be secured even when a large quantity of water is generated in a high current density region. Also, the ratio of the above areal weight is set at 0.55 times or less, whereby the large pores continuous in the through-plane direction and the microporous part (B) continuous in the through-plane direction can be efficiently formed, and a water path can be secured, thus a water path can be secured even when a large quantity of water is generated in a high current density region. Accordingly, the most preferred structure can be obtained in this range.

Here, the areal weight of the microporous part (B) can be determined by the method described above.

Furthermore, the microporous part (B) has a small pore that is smaller than the pore in the electrode substrate, and maintains good gas diffusivity, thus it is desirable that the microporous part (B) has a pore that is smaller than the large pore formed by the electrode substrate and is moderately large, namely, a small pore of about 0.5 μm or more and 5 μm or less. When having a small pore having a pore diameter of 0.5 μm or more, the microporous part has water removal performance, and gas diffusivity can be improved. Meanwhile, the pore diameter is set at 5 μm or less, thereby discharge of liquid water from the small pore of the microporous part can be promoted, thus gas diffusion of the microporous part can be increased even in the condition in which a large quantity of water is generated.

From the viewpoint of the improving electrical conductivity and water removal performance, it is preferred to use a porous material containing a carbon based filler in the microporous part (A) or (B) or both of them. Namely, it is preferred that the microporous parts (A) and (B) contain a carbon based filler. Here, carbon black is representative as the carbon based filler.

As the carbon based filler, it is desirable to use a carbon based filler having an aspect ratio of 30 or more and 5000 or less. By the use of the above carbon based filler, many small pores of moderate size can be formed, thus gas diffusivity can be improved. Therefore, a gas diffusion electrode substrate that can satisfy both gas diffusivity and water removal performance is obtained. When the aspect ratio of the carbon based filler is less than 30, entanglement of the carbon based filler in the carbon coating solution is reduced, and the viscosity of the carbon coating solution is lowered, thus strike-through of the carbon coating solution cannot be suppressed. Meanwhile, when the aspect ratio of the carbon based filler is more than 5000, there are problems that entanglement of the carbon based filler in the carbon coating solution becomes excessive, and aggregation and precipitation of the solid content are caused in the carbon coating solution. In the present invention, the aspect ratio of the carbon based filler is preferably 35 or more, and further preferably 40 or more. Also, the aspect ratio of the carbon based filler is preferably 3000 or less, and further preferably 1000 or less.

Here, the aspect ratio of the carbon based filler is obtained as described below. When the carbon based filler is a fibrous carbon, the aspect ratio means mean length (μm)/mean diameter (μm). The mean length is an average value determined by taking a photograph under a microscope, such as a scanning electron microscope or a transmission electron microscope, at a magnification of 1000 or more, randomly selecting 10 different fibrous carbons, and measuring their lengths. The mean diameter is an average value determined by taking a photograph under a microscope, such as a scanning electron microscope or a transmission electron microscope, at a magnification of 10000 or more, randomly selecting 10 different fibrous carbons, and measuring their diameters. As the scanning electron microscope, S-4800 manufactured by Hitachi, Ltd. or its equivalent product can be used.

When the carbon based filler is flaky graphite, the aspect ratio means mean particle size (μm) /mean thickness (μm). The mean particle size is a 50% cumulative diameter on a volume basis determined by measuring by use of a laser diffraction particle size distribution analyzer. The mean thickness is an average value determined by taking a photograph under a microscope, such as a scanning electron microscope or a transmission electron microscope, at a magnification of 10000 times or more, randomly selecting 10 different flaky graphites, and measuring their thicknesses. As the scanning electron microscope, S-4800 manufactured by Hitachi, Ltd. or its equivalent product can be used.

As the carbon based filler having an aspect ratio of 30 or more and 5000 or less, it is preferred to use a fibrous carbon having an aspect ratio of 30 or more and 5000 or less. Here, the fibrous carbon includes a vapor grown carbon fiber, a single-walled carbon nanotube, a double-walled carbon nanotube, a multi-walled carbon nanotube, a carbon nanohorn, a carbon nanocoil, a cup-layered type carbon nanotube, a bamboo-like carbon nanotube, and a graphite nanofiber. Among them, a vapor grown carbon fiber, a single-walled carbon nanotube, a double-walled carbon nanotube, and a multi-walled carbon nanotube are cited as a fibrous carbon preferred to be used in the present invention, since the aspect ratio can be increased, and their electrical conductivity and mechanical properties are excellent. A vapor grown carbon fiber is one obtained by growing carbon in a vapor phase by a catalyst, and those having a mean diameter of 5 nm or more and 200 nm or less, and a mean fiber length of 1 μm or more and 20 μm or less are preferred. Also, the carbon based filler capable of obtaining one having a specific aspect ratio includes flake graphite, scaly graphite, artificial graphite, expanded graphite, flaky graphite, and the like, other than fibrous carbons, and the carbon based filler that is likely to obtain one having a specific aspect ratio includes flaky graphite, other than fibrous carbons.

In the present invention, when using a fibrous carbon having a specific aspect ratio, the mean length thereof is preferably in the range of 0.1 μm or more and 30 μm or less. The mean length of the fibrous carbon having a specific aspect ratio is more preferably 1 μm or more, and further preferably 2 μm or more. Also, the mean length of the fibrous carbon having a specific aspect ratio is more preferably 20 μm or less, and further preferably 15 μm or less. When the mean length of the above fibrous carbon is 0.1 μm or more, the viscosity of the carbon coating solution is increased, thus strike-through is suppressed, and gas diffusivity and water removal performance of the electrode substrate are increased, thus flooding can be suppressed. In the present invention, when using a fibrous carbon having a specific aspect ratio, it is preferred to use fibrous carbon having a diameter in the range of 1 nm or more and 500 nm or less.

In the present invention, it is preferred that the microporous part (A) or (B) or both of them contain a carbon based filler having a specific aspect ratio, and it is also preferred to further contain various carbon based fillers other than the carbon based filler described above. The carbon based filler having no specific aspect ratio includes carbon black, such as furnace black, acetylene black, lamp black and thermal black, and graphites, such as flake graphite, scaly graphite, earthy graphite, artificial graphite, expanded graphite and flaky graphite, in which the aspect ratio is not in the range of 30 or more and 5000 or less, and fibrous carbon such as CNT in which the aspect ratio is not in the range of 30 or more and 5000 or less, and among them, those using carbon black is more preferred, and those using acetylene black is most preferred. The mixing mass ratio of carbon black to the carbon based filler having a specific aspect ratio is preferably in the range of 1 or more and 20 or less, more preferably in the range of 1.5 or more and 19 or less, and further preferably in the range of 2 or more and 10 or less. When the mixing mass ratio described above is 1 or more, the porosity is moderate in the microporous part (A) or (B) or both of them containing a carbon based filler having a specific aspect ratio and carbon black, thus water vapor diffusivity is small, and dry-out can be suppressed. When the above mixing mass ratio is 20 or less, electrical conductivity in the microporous part can be increased by the effect of containing a carbon based filler having a specific aspect ratio, thus whole fuel cell performance can be improved, and further the microporous part having a sufficient thickness in the electrode substrate surface layer is formed, and back-diffusion is promoted, thus dry-out can be suppressed.

In the present invention, from the viewpoint of the promoting water removal of liquid water, it is preferred that the microporous part (A) or (B) or both of them contain a water repellent agent in combination with a carbon based filler. Among them, as the water repellent agent, a fluorine-based polymer is preferably used because of its excellent corrosion resistance. The fluorine-based polymer includes polytetrafluoroethylene resins (PTFE), tetrafluoroethylene-hexa fluoro propylene copolymers (FEP), tetrafluoroethylene-perfluoroalkylvinyl ether copolymers (PFA), and the like. In order to obtain a uniform water-repellent state in which melt viscosity on sintering is low, it is preferred to use a water repellent agent having a melting point of 200° C. or more and 320° C. or less, and such a water repellent agent includes FEP or PFA. By using these water repellent agents, it is possible to remove liquid water condensed in small pores of the microporous part (B) to large pores, and water removal performance from the large pore to a flow channel of the bipolar plate can be remarkably increased. Whereby, accumulation of water in the inside of the electrode substrate can be reduced, thus gas diffusivity can be greatly improved even in the conditions of generating a large amount of liquid water due to high load power generation, and leads to a great improvement in fuel cell performance.

The content of the water repellent agent in the microporous part (A) or (B) is preferably 5% by mass or more, more preferably 10% by mass or more, and further preferably 15% by mass or more, in a mass ratio to the carbon based filler in the microporous part (value in a case where the mass of the carbon based filler is defined as 100% by mass). Also, the content of the water repellent agent is preferably 50% by mass or less, more preferably 35% by mass or less, and further preferably 30% by mass or less, in a mass ratio to the carbon based filler. The content of the water repellent agent is set in the above range, whereby gas diffusivity of the microporous part can be more improved while having sufficient hydrophobicity.

In the present invention, from the viewpoint of promoting discharge of liquid water and suppressing water vapor diffusion, various materials can be used in combination with a carbon based filler in the microporous part (A) or (B) or both of them.

In the present invention, the porosity of the microporous part (A) or (B) or both of them is preferably 60% or more, more preferably 65% or more, and further preferably 70% or more. Also, the above porosity is preferably 90% or less, more preferably 87% or less, and further preferably 84% or less. When the porosity is 60% or more, water removal performance is further improved, and flooding can thus be further suppressed. When the porosity is 90% or less, water vapor diffusion is small, and dry-out can thus be suppressed. In addition, high electrical conductivity is attained, and the fuel cell performance is thus improved at both high and low temperatures. Particularly, it is preferred that the microporous part (B) contains a water repellent agent, and the porosity is in the above range. The microporous part having the above porosity is obtained by controlling the areal weight of the microporous part, the content of the carbon based filler based on other materials including the water repellent agent, the type of the carbon based filler, and the thickness of the microporous part, in the production method described below. Among them, it is effective to control the content of the carbon based filler based on other materials including the water repellent agent, and the type of the carbon based filler. Here, a microporous part with a high porosity is obtained by increasing the content of the carbon based filler based on other materials including a water repellent agent and an extinction material, and a microporous part with a low porosity is obtained by decreasing the content of the carbon based filler based on other materials including the water repellent agent. Also, the porosity of the microporous part (B) is larger than the porosity of the microporous part (A) preferably by 5% or more, and more preferably by 10% or more. Also, the difference between the porosity of the microporous part (B) and the porosity of the microporous part (A) is preferably 5% or more, and more preferably 10% or more. It is because water removal performance can be improved by utilizing a characteristic that the liquid water condensed in the inside of the microporous part (A) is likely to be removed to the microporous part (B) having high porosity.

Here, the porosity of the microporous part (A) or microporous part (B) is determined by using a sample for cross-section observation prepared by use of an ion beam cross-section processing apparatus, taking a photograph of a cross-section under a microscope such as a scanning electron microscope at a magnification of 5000 times or more and 20000 times or less, measuring an area of the pore part, and then calculating an area ratio of the pore part to the observed area. At that time, the part of the image with the average brightness or less is determined as a pore, and the pore can be distinguished by binarization. The average brightness can be obtained as described below. First, based on the brightness information of pixels obtained by the image analysis, a histogram showing 256 levels of brightness at a horizontal axis and the number of pixels by brightness at a vertical axis is prepared. In the range where the number of pixels is more than or equal to the numerical value obtained by dividing the total number of pixels by 2560 in the histogram, the brightness that is the median of the range is calculated and defined as the average brightness. As the scanning electron microscope, S-4800 manufactured by Hitachi, Ltd. or its equivalent product can be used.

Next, a method suitable for obtaining the gas diffusion electrode substrate of the present invention will be concretely described with reference to an example of the "baked carbon fiber" obtained from a carbon fiber papermaking substrate, as an electrode substrate.

<Papermaking Substrate and Production Method of Papermaking Substrate>

In order to obtain a carbon fiber-containing papermaking substrate, a wet papermaking method in which a carbon fiber-containing paper sheet is produced by dispersing carbon fibers in a liquid, a dry papermaking method in which a carbon fiber-containing paper sheet is produced by dispersing carbon fibers in the air, or the like is employed. Among them, a wet papermaking method is preferably employed because of its excellent productivity.

For the purpose of improving the water removal performance and gas diffusivity of the electrode substrate, carbon fibers can be mixed with an organic fiber to make a paper. As the organic fiber, a polyethylene fiber, a vinylon fiber, a polyacetal fiber, a polyester fiber, a polyamide fiber, a rayon fiber, an acetate fiber or the like can be used.

Further, for the purpose of improving the shape-retaining property and ease of handling of the papermaking substrate, an organic polymer can be incorporated as a binder. Here, as the organic polymer, polyvinyl alcohol, polyvinyl acetate, polyacrylonitrile, cellulose or the like can be used.

In order to maintain the in-plane electrical conductivity and thermal conductivity to be isotropic, the papermaking substrate is preferably in the form of a sheet in which carbon fibers are randomly dispersed in a two-dimensional plane.

Although the pore size distribution obtained for the papermaking substrate is influenced by the content rate and dispersion state of the carbon fibers, the pores can be formed at a size of about 20 μm or more and 500 μm or less.

The papermaking substrate has a carbon fiber areal weight preferably in the range of 10 g/m$^2$ or more to 60 g/m$^2$ or less, and more preferably in the range of 15 g/m$^2$ or more to 50 g/m$^2$ or less. When the carbon fiber areal weight is 10 g/m$^2$ or more, the electrode substrate has excellent mechanical strength, which is preferred. When the carbon fiber areal weight is 60 g/m² or less, the electrode substrate has excellent gas diffusivity and water removal performance, which is also preferred. In cases where a plurality of papermaking substrates are laminated, it is preferred that the post-lamination carbon fiber areal weight be in the above-described range.

Here, the carbon fiber areal weight in the electrode substrate can be determined by retaining a papermaking substrate cut into a 10-cm square under a nitrogen atmosphere in an electric furnace at a temperature of 450° C. for 15 minutes and then dividing the mass of the residue obtained by removal of organic matters by the area of the papermaking substrate (0.01 m²).

<Impregnation of Resin Component>

As a method for impregnating a carbon fiber-containing papermaking substrate with a resin component, a method of dipping a papermaking substrate into a resin component-containing resin composition, a method of coating a papermaking substrate with a resin component-containing resin composition or a method of laminating and transferring a film composed of a resin component onto a papermaking substrate can be employed. Among them, a method of dipping a papermaking substrate into a resin component-containing resin composition is preferably employed because of its excellent productivity.

The resin component is carbonized on baking to yield an electrically conductive carbide. The resin composition refers to a resin component to which a solvent or the like is added as required. Here, the term "resin component" refers to a component which contains a resin such as a thermosetting resin and, as required, an additive(s) such as a carbon based filler and a surfactant.

It is preferred that the carbonization yield of the resin component contained in the resin composition be 40% by mass or more. When the carbonization yield is 40% by mass or more, the electrode substrate attains excellent mechanical properties, electrical conductivity and thermal conductivity, which is preferred.

The resin constituting the resin component includes thermosetting resins such as phenolic resins, epoxy resins, melamine resins and furan resins, and the like. Among them, a phenolic resin is preferably used because of its high carbonization yield. Further, as an additive to be added to the resin component as required, a carbon based filler can be added for the purpose of improving the mechanical properties, electrical conductivity and thermal conductivity of the electrode substrate. Here, as the carbon based filler, a carbon black, a carbon nanotube, a carbon nanofiber, a milled carbon fiber, graphite or flaky graphite can be used.

The resin composition may use a resin component obtained by the above-described constitution as it is, and the resin composition may also contain, as required, a variety of solvents for the purpose of improving the impregnation into a papermaking substrate. Here, as the solvent, methanol, ethanol, isopropyl alcohol or the like can be used.

It is preferred that the resin composition be in a liquid form under a condition of 25° C. and 0.1 MPa. When the resin composition is in a liquid form, it has excellent impregnation property into a papermaking substrate, so that the electrode substrate attains excellent mechanical properties, electrical conductivity and thermal conductivity, which is preferred.

In the present invention, a resin component is impregnated in an amount of preferably 30 parts by mass or more and 400 parts by mass or less, and more preferably 50 parts by mass or more and 300 parts by mass or less, with respect to 100 parts by mass of the carbon fibers. When the amount of the impregnated resin component is 30 parts by mass or more, the electrode substrate has excellent mechanical properties, electrical conductivity and thermal conductivity, which is preferred. Meanwhile, when the amount of the impregnated resin component is 400 parts by mass or less, the electrode substrate has excellent gas diffusivity, which is also preferred.

When impregnating a resin component into a papermaking substrate, a papermaking substrate imparted with a resin component is sandwiched between a roll on which irregularities are formed and a smooth roll to be impregnated, whereby a difference in the loading amount of resin component can be provided between both sides. The surface with an increased amount of adhesion of the resin component has a small surface roughness in the electrode substrate to be obtained.

<Lamination and Annealing>

A prepreg in which a carbon fiber-containing papermaking substrate is impregnated with a resin component is formed, and then the obtained prepreg can be annealed and/or laminated prior to carbonization.

In order to allow the electrode substrate to have a prescribed thickness, a plurality of such prepregs can be laminated. In this case, a plurality of prepregs having the same properties can be laminated, or a plurality of prepregs having different properties can be laminated. Specifically, it is possible to laminate a plurality of prepregs that are different in terms of the mean diameter and mean length of the carbon fibers, the carbon fiber areal weight of the papermaking substrate, the amount of the impregnated resin component, or the like.

In order to increase viscosity of the resin component or partially cross-link the resin component, the prepreg can be subjected to annealing. As an annealing method, a method of blowing hot air against the prepreg, a method of heating the prepreg by sandwiching it between hot platens of a press apparatus, a method of heating the prepreg by sandwiching it between continuous belts, or the like can be employed.

<Carbonization>

After impregnating the carbon fiber-containing papermaking substrate with the resin component, the resulting papermaking substrate is baked in an inert atmosphere to perform carbonization. For this baking, a batch-type heating furnace or a continuous heating furnace can be used. Further, the inert atmosphere can be obtained by allowing an inert gas such as nitrogen gas or argon gas to flow in the heating furnace.

The highest temperature in the baking is preferably in the range of 1300° C. or more and 3000° C. or less, more preferably in the range of 1700° C. or more and 3000° C. or less, and further preferably in the range of 1900° C. or more and 3000° C. or less. When the highest temperature is 1300° C. or more, carbonization of the resin component is facilitated, so that the electrode substrate attains excellent electrical conductivity and thermal conductivity, which is preferred. Meanwhile, when the highest temperature is 3000° C. or less, the operating cost of the heating furnace is reduced, which is also preferred.

It is preferred that the temperature rising rate in the baking be in the range of 80° C./min or more and 5000° C./rain or less. When the temperature rising rate is 80° C./min or more, excellent productivity is preferably attained. Meanwhile, when the temperature rising rate is 5000° C./min or less, carbonization of the resin component slowly proceeds and a dense structure is formed, thus the electrode substrate attains excellent electrical conductivity and thermal conductivity, which is preferred.

A carbon fiber-containing papermaking substrate which is impregnated with a resin component and then carbonized is referred to as "baked carbon fiber".

<Hydrophobic Treatment>

In order to improve the water removal performance, the baked carbon fiber is preferably subjected to a hydrophobic treatment. The hydrophobic treatment can be performed by coating a water repellent agent on the baked carbon fiber and subsequently annealing the coated baked carbon fiber. Here, as the water repellent agent, a fluorine-based polymer is preferably used because of its excellent corrosion resistance. The fluorine-based polymer includes polychlorotrifluoroethylene resins (PCTFE), polytetrafluoroethylene resins (PTFE), polyvinylidene fluoride resins (PVDF), tetrafluoroethylene-hexa fluoro propylene copolymers (FEP), tetrafluoroethylene-perfluoroalkylvinyl ether copolymers (PFA), tetrafluoroethylene-ethylene copolymers (ETFE), and the like. The amount of the water repellent agent to be coated is 1 part by mass or more, preferably 2 parts by mass or more, more preferably 3 parts by mass or more, further preferably 5 parts by mass or more, particularly preferably 7 parts by mass or more, and most preferably 10 parts by mass or more, with respect to 100 parts by mass of the baked carbon fiber. The amount of the water repellent agent to be coated is preferably 50 parts by mass or less, more preferably 40 parts by mass or less, and further preferably 30 parts by mass or less, with respect to 100 parts by mass of the baked carbon fiber. When the amount of the coated water repellent agent is 1 part by mass or more, the electrode substrate has excellent water removal performance, which is preferred. Meanwhile, when the amount of the coated water repellent agent is 50 parts by mass or less, the electrode substrate has excellent electrical conductivity, which is also preferred.

It is noted here that, a baked carbon fiber subjected to a hydrophobic treatment as necessary is described as an "electrode substrate". When a baked carbon fiber is not subjected to a hydrophobic treatment, the baked carbon fiber and "electrode substrate" refer to the same one.

<Formation of Microporous Parts>

The microporous part (A) or (B) is formed by coating or dipping the electrode substrate with a carbon coating solution to place a precursor of the microporous part in the one surface or inside of the electrode substrate, and drying and sintering it. It is preferred to form a precursor of the microporous part by mixing a carbon based filler having the specific aspect ratio described above to the carbon coating solution. More specifically, the precursor of the microporous part is formed as described below.

The carbon coating solution is at least constituted by a carbon based filler and a dispersion medium such as water or an organic solvent, and may contain a dispersant such as a surfactant. Water is preferred as the dispersion medium, and it is more preferred to use a nonionic surfactant as the dispersant. Also, it is preferred to contain the water repellent agent as described above.

The coating or dipping of the carbon coating solutions onto the electrode substrate can be carried out by using a variety of commercially available apparatuses. As a coating method, screen printing, rotary screen printing, spraying, intaglio printing, comma coating, reverse roll coating, gravure printing, die coating, bar coating, knife coating, blade coating or the like can be employed. The above-described coating methods are presented for the illustration purpose only, and the coating method is not necessarily restricted thereto.

It is preferred that the carbon coating solution that is a precursor of the microporous part (B) has a low viscosity since it is impregnated into the electrode substrate to obtain a microporous part continuous to the internal structure, and it is desirable that the viscosity when measured by an E-type viscometer at a cone angle of 2° and a shear rate of 17 $s^{-1}$ is 5 Pa·s or less, and further preferably 1 Pa·s or less. For uniform impregnation, the carbon coating solution may contain alcohols such as isopropyl alcohol and ethanol and glycols such as ethylene glycol, other than water, as the dispersion medium.

When the electrode substrate is coated with or dipped in the low viscous carbon coating solution described above for forming the microporous part (B) on the electrode substrate and dried to form a precursor of the microporous part (B), in the state that the carbon coating solution for forming the microporous part (B) is impregnated into the electrode substrate by dipping and the coating liquid has flowability before drying, the impregnation state is controlled by applying an air flow from one surface of the electrode substrate. Namely, an air flow is applied in spots by slits or nozzle by pressurizing in the through-plane direction, whereby the carbon coating solution that is the microporous part (B) is locally impregnated to the inside of the electrode substrate in roughly through-plane direction, and the distribution of the microporous part (B) and pores can be efficiently obtained.

As another method, the electrode substrate is coated from one surface thereof with the carbon coating solution for forming the microporous part (B), and further pressurized by a roll or bar from the surface, then dried to form a precursor of the microporous part (B), whereby a structure in which the microporous part (B) is continuous to the inside of the electrode substrate in roughly through-plane direction can be also formed.

In addition, the carbon coating solution for forming the microporous part (B) may be coated on the electrode substrate in a pattern, further impregnated, and then dried to form a precursor of the microporous part (B).

Using the electrode substrate having the thus formed precursor of the microporous part, the carbon coating solution for forming the microporous part (A) was coated on one surface thereof, dried, and sintered.

Drying after coating or impregnation of the carbon coating solution onto the electrode substrate is usually performed at a temperature of 80° C. or more and 120° C. or less. That is, the coated matter is placed in a dryer whose temperature is set at 80° C. or more and 120° C. or less and dried for 5 minutes or more and 30 minutes or less. Drying may be performed in an air or performed in an inert gas such as nitrogen gas.

As described above, solid contents in the carbon coating solution (carbon based filler, water repellent agent, surfactant, etc.) are remained after drying, and a precursor of the microporous part is formed.

The dried coated matter (electrode substrate on which the precursor of the microporous part is formed) is placed in a muffle furnace, a baking furnace or a high-temperature drying furnace and heated at 300° C. or more and 380° C. or less, for 5 minutes or more and 20 minutes or less to melt the water repellent agent, and the melted water repellent agent is sintered using carbon based fillers as a binder, thereby forming a microporous part.

In the present invention, a membrane electrode assembly can be constituted by binding the above-described gas diffusion electrode substrate on at least one surface of a solid polymer electrolyte membrane having a catalyst layer on both sides. At this time, when the microporous part (A) is arranged on the catalyst layer side, back-diffusion of the generated water is more likely to occur, and also the contact area between the catalyst layer and the gas diffusion electrode substrate is increased, so that the contact electrical resistance can be reduced.

The fuel cell is constituted by having bipolar plates on both sides of the above membrane electrode assembly. Usually, a polymer electrolyte fuel cell is constituted by laminating a plurality of the above membrane electrode assemblies that are sandwiched by bipolar plates from both sides via a gasket. The catalyst layer is composed of a layer containing a solid polymer electrolyte and a carbon material of carbon-supported catalyst. As the catalyst, platinum is usually used. In a fuel cell in which a carbon monoxide-containing reformed gas is supplied to the anode side, it is preferred to use platinum and ruthenium as catalysts of the anode side. As the solid polymer electrolyte, it is preferred to use a perfluorosulfonic acid-based polymer material having high protonic conductivity, oxidation resistance, and heat resistance. The constitutions themselves of the above fuel cell unit and fuel cell are well known.

EXAMPLES

Hereinbelow, the present invention will be concretely described by way of examples and comparative examples. The materials, the method for producing an electrode substrate, and the method for producing a gas diffusion electrode substrate that are used in the examples and comparative examples, and various evaluation methods such as the battery performance evaluation method of fuel cell, are described below.

<Materials>

A. Carbon Based Filler

"DENKA BLACK" (registered trademark) (acetylene black, manufactured by Denka Company Limited, mean particle size: 0.035 µm, aspect ratio: 1)

Vapor phase growth carbon fibers "VGCF" (registered trademark) (manufactured by SHOWA DENKO K. K., mean diameter: 0.15 µm, mean fiber length: 8 µm, aspect ratio: 50, a kind of fibrous carbon)

Multi-walled carbon nanotube (manufactured by Cheap Tubes Inc, mean diameter: 0.015 µm, mean fiber length: 20 µm, aspect ratio: 1300, a kind of fibrous carbon)

B. Water Repellent Agent

PTFE resin "POLYFLON" (registered trademark) D-1E (manufactured by Daikin Industries, Ltd.)

FEP resin "NEOFLON" (registered trademark) ND-110 (manufactured by Daikin Industries, Ltd.)

C. Surfactant

"TRITON" (registered trademark) X-100 (nonionic surfactant, manufactured by Nacalai Tesque, Inc.)

<Preparation of Electrode Substrate>

Carbon fibers were cut at a mean length of 12 mm and dispersed in water to continuously make a paper by a wet papermaking method. Further, a 10% by mass aqueous solution of polyvinyl alcohol was coated as a binder and then dried to prepare a papermaking substrate having a carbon fiber areal weight of 37.5 g/m². The amount of the coated polyvinyl alcohol was 22 parts by mass with respect to 100 parts by mass of the papermaking substrate.

Using a mixture of a resol type phenolic resin and a novolak type phenolic resin as a thermosetting resin, a flake graphite as a carbon based filler, and methanol as a solvent, the materials were mixed at a ratio of thermosetting resin/carbon based filler/solvent=10 parts by mass/5 parts by mass/85 parts by mass, and the resulting mixture was stirred for 1 minute using an ultrasonic dispersion apparatus to obtain a uniformly dispersed resin composition.

The papermaking substrate was cut into a size of 15 cm ×12.5 cm and dipped into the resin composition filled in an aluminum tray, thereby impregnating 130 parts by mass of the resin component (thermosetting resin+carbon based filler) with respect to 100 parts by mass of the carbon fibers, then the papermaking substrate was dried by heating at 100° C. for 5 minutes to prepare a prepreg. Next, the prepreg was annealed at 180° C. for 5 minutes while being pressurized by a pressing machine with flat plates. Here, when pressing the prepreg, the space between the upper and lower press plates was adjusted by arranging a spacer in the pressing machine with flat plate such that the annealed prepreg had a thickness of 130 µm.

A substrate with the annealed prepreg was introduced into a heating furnace having the highest temperature of 2400° C., in which a nitrogen gas atmosphere was maintained, to obtain a baked carbon fiber.

Then, a PTFE resin "POLYFLON" (registered trademark) D-1E was coated so as to have a loading amount after drying of 5 parts by mass with respect to 100 parts by mass of the baked carbon fiber, and the resultant was dried by heating at 100° C. for 5 minutes to prepare an electrode substrate 1 with an areal weight of 25 g/m² and a thickness of 100 µm.

Also, an electrode substrate 2 with an areal weight of 45 g/m² and a thickness of 180 µm was obtained in the same manner, except for setting the carbon fiber areal weight at 65 g/m², and an electrode substrate 3 with an areal weight of 50 g/m² and a thickness of 200 µm was obtained in the same manner, except for setting the carbon fiber areal weight at 72 g/m².

<Formation of Precursor of Microporous Part (B)>

A carbon coating solution containing a carbon based filler and a water repellent agent was prepared. An electrode substrate was dipped in this coating liquid, and left for 10 minutes, then taken out into the air, and squeezed with a roll to remove excess impregnation liquid, then introduced into a drying furnace in 2 minutes or less, and dried at 100° C. for 10 minutes. The carbon coating solution used herein was prepared by using a carbon based filler and a water repellent agent adjusted to have a composition ratio shown in Tables 1 to 3, adding 32.5 parts by mass of a surfactant with respect to 100 parts by mass of the carbon based filler, and adjusting the mixture with purified water. Impregnation and drying were repeated to adjust the areal weight of the impregnated microporous part (B) to obtain a target areal weight amount.

<Formation of Microporous Part (A)>

The surface of the electrode substrate on which a precursor of the microporous part (B) was formed was coated with a carbon coating solution in a planar form, with a die coater, and then dried at 120° C. for 10 minutes and sintered by heating at 380° C. for 20 minutes to form a planar microporous part (A). The carbon coating solution used herein used a carbon coating solution prepared by mixing 7.7 parts of DENKA BLACK as a carbon based filler, 2.5 parts of POLYFLON as a water repellent agent, 20 parts of TRITON X-100 as a surfactant, and 100 parts of purified water as a precursor. The electrode substrate was coated so as to have an areal weight of 15 g/m² after sintering. As a result of measurement in the method described in <Measurement of Various Thickness> described below, the thickness of the microporous part (A) was 30 μm. Also, when the porosity was measured by the method described in the <Measurement Method of Porosity> described below, the porosity of the microporous part (A) was 64%.

<Measurement Method of Viscosity of Carbon Coating Solution>

Measurement was carried out by an E-type viscometer at a cone angle of 2°, a shear rate of 17 s$^{-1}$, and a temperature of 23° C. The measurement was repeated three times, and the average value was defined as the viscosity.

<Evaluation Methods of Continuity and Density of Microporous Part (B) and Large Pores>

The cross sectional structure was evaluated for the resulting gas diffusion electrode substrate as described below.

The cross section in the through-plane direction was formed by ion milling, using the resulting gas diffusion electrode substrate. Since the length of one cross section was about 1 mm, 5 cross sections were formed, and the observed under a scanning electron microscope S-4800 manufactured by Hitachi, Ltd., and the presence or absence of the part in which the microporous part (B) is continuously present from the electrode substrate surface on the side on which the microporous part (A) is formed to a position near the electrode substrate surface on the opposite side, namely, the presence or absence of continuity of the microporous part (B) and large pores. The cross section was observed at a magnification of 400, and when the microporous part of the inside of the electrode substrate had a width of 10 μm even at the minimum part, and there was a part having ¾ or more thickness of the thickness of the electrode substrate, it was judged that there was one continuous microporous part, and defined as continuous. Large pores were observed in the same manner, and the continuity thereof was confirmed. The numbers of continuous microporous part (B) and continuous large pores confirmed herein were each divided by the length (mm) of the electrode substrate in the longitudinal direction (in-plane direction), and the density of continuous microporous part (B) [parts/mm] and the density of continuous large pores [pores/mm] were calculated.

<Measurement Method of Porosity>

The cross section in the through-plane direction was formed by ion milling, using the resulting gas diffusion electrode substrate. Each of the microporous part (A) and the microporous part (B) of the cross section was magnified 10000 times using a scanning electron microscope S-4800 manufactured by Hitachi, Ltd., and a photograph was taken by imaging using a reflected electron, then the area of pore part was measured to obtain the area ratio of the pore part to the observation area. At that time, the part of the image with the average brightness or less was determined as a pore, and distinguished by binarization. The numerical values obtained by calculating the area ratio of the pores were each defined as the porosity of the microporous part (A) and the porosity of the microporous part (B). More specifically, the average brightness was obtained as described below. First, in the image analysis, a histogram showing 256 levels of brightness at a horizontal axis and the number of pixels by brightness at a vertical axis was prepared. In the range where the number of pixels was more than or equal to the numerical value obtained by dividing the total number of pixels by 2560 in the histogram, the brightness that was the median of the range was defined as the average brightness.

<Measurement of Various Thickness>

When the gas diffusion electrode substrate or electrode substrate was an object to be measured, 10 points to be measured were randomly selected from the objects to be measured, and the individual thickness was measured by a micrometer by pressurizing at 0.15 MPa in the through-plane direction by a terminal with a round tip size of 3 mm in diameter, then the individual thickness at 10 points were averaged, and was defined as the thickness of the object to be measured. The through-plane direction means a direction orthogonal to the substrate surface. The thickness of the microporous part (A) was defined as a value obtained by subtracting the thickness of the electrode substrate from the thickness of the whole gas diffusion electrode substrate.

<Measurement of Various Areal Weights>

First, mass [g] (W1) of the electrode substrate was measured in a shape of a 10 cm square using a precision scale. The numerical value obtained by dividing W1 by 0.01 was defined as the areal weight [g/m$^2$] of the electrode substrate.

Next, mass [g] (W2) of the electrode substrate on which the microporous part (B) was formed was measured in a shape of a 10 cm square as well. The numerical value obtained by subtracting W1 from W2 and dividing this value by 0.01 was defined as the areal weight [g/m$^2$] of the microporous part (B).

<Measurement of Melting Point of Water Repellent Agent>

The melting point of the water repellent agent was measured by differential scanning calorimetric analysis. Using DSC6220 manufactured by Seiko Instruments Inc. (SII) as the apparatus, the temperature was changed from 30° C. to 400° C. at a heating rate of 2° C./rain in nitrogen. The endothermic and exothermic peaks at that time were observed, and the endothermic peak at a temperature of 150° C. or more was defined as the melting point of the water repellent agent.

<Measurement of Surface Roughness>

The surface roughness of the electrode substrate was measured using a laser microscope. The measurement was performed by scanning a 5 mm square range with an objective lens with a magnification of 10, using VK-X100 (manufactured by KEYENCE CORPORATION) as a measuring apparatus, and plane tilt correction was performed, then the arithmetic average roughness (Ra) in the 5 mm square was obtained. The measurement was performed for randomly selected 10 points, and the average of arithmetic average roughness at each point was defined as the surface roughness [μm].

<Evaluation of Fuel Cell Performance of Polymer Electrolyte Fuel Cell>

A catalyst paste was prepared by sequentially adding 1.00 g of a carbon material of carbon-supported platinum catalyst (manufactured by Tanaka Kikinzoku Kogyo K. K., platinum supporting amount: 50% by mass), 1.00 g of purified water, 8.00 g of "Nafion" (registered trademark) solution (manufactured by Aldrich, "Nafion" (registered trademark), 5.0% by mass) and 18.00 g of isopropyl alcohol (manufactured by Nacalai Tesque, Inc.).

Then, on a "NAFLON" (registered trademark) PTFE tape "TOMBO" (registered trademark) No. 9001 (manufactured by NICHIAS Corporation) which was cut into a size of 7 cm×7 cm, the obtained catalyst paste was coated using a spray and dried at room temperature to prepare a PTFE sheet equipped with a catalyst layer having a platinum amount of 0.3 mg/cm$^2$. Then, a solid polymer electrolyte membrane, "Nafion" (registered trademark) NRE-211CS (manufactured by DuPont) which was cut into a size of 10 cm×10 cm was sandwiched with two catalyst layer-equipped PTFE sheets. The resultant was pressed at 130° C. for 5 minutes while pressurizing at 5 MPa using a pressing machine with flat plates, thereby transferring the respective catalyst layers onto the solid polymer electrolyte membrane. After pressing, the PTFE sheets were removed to prepare a catalyst layer-equipped solid polymer electrolyte membrane.

Next, the obtained catalyst layer-equipped solid polymer electrolyte membrane was sandwiched with two gas diffusion electrode substrates cut into a size of 7 cm×7 cm, and the resultant was pressed at 130° C. for 5 minutes while pressurizing at 3 MPa using a pressing machine with flat plates, thereby preparing a membrane electrode assembly. It is noted here that the gas diffusion electrode substrate was arranged such that the surface having the planar microporous part was in contact with the catalyst layer.

The obtained membrane electrode assembly was incorporated into a fuel cell evaluation unit cell to measure the voltage when the current density was changed. Here, as a bipolar plate, a serpentine-type bipolar plate having one flow channel of 1.5 mm in channel width, 1.0 mm in channel depth and 1.1 mm in rib width was used. Further, the evaluation was carried out with hydrogen pressurized at 210 kPa and air pressurized at 140 kPa being supplied to the anode side and the cathode side, respectively. The hydrogen and air were both humidified using a humidification pot whose temperature was set at 70° C. Also, the utilization ratios of the hydrogen and atmospheric oxygen were set at 80% and 67%, respectively.

First, the current density when the output voltage was 0.2 V at an operation temperature of 40° C. and a humidification temperature of 40° C. was measured, and the measured value was used as an index of the anti-flooding characteristic (low-temperature performance). Next, the current density when the output voltage was 0.2 V at a humidification temperature of 80° C. and an operation temperature of 80° C. was measured, and the measured value was used as an index of the anti-dry-out characteristic (high-temperature performance).

(Example 1)

A gas diffusion electrode substrate was obtained according to the methods described in <Preparation of Electrode Substrate>, <Formation of Precursor of Microporous Part (B)> and <Formation of Microporous Part (A)>. Here, as shown in Table 1, using the electrode substrate 1 with an areal weight of 25 g/m² having a thickness of 100 μm as the range that the microporous part (B) can impregnate into the inside of the electrode substrate, the impregnation areal weight was set at 0.3 times as the areal weight of the electrode substrate for forming the microporous part (B) and pore that are continuous in the through-plane direction. As a result of the cross sectional structure evaluation, the structure of the microporous part (B) and large pore continuous to the inside of the electrode substrate in the through-plane direction could be confirmed, and as a result of evaluating fuel cell performance using this gas diffusion electrode substrate, as shown in Table 1, the anti-flooding characteristic was greatly improved without deterioration of anti-dry-out characteristic, as compared to the comparative examples.

(Example 2)

A gas diffusion electrode substrate was obtained according to the methods described in <Preparation of Electrode Substrate>, <Formation of Precursor of Microporous Part (B)> and <Formation of Microporous Part (A)>. Here, as shown in Table 1, using the electrode substrate 1 with a thickness of 100 μm and an areal weight of 25 g/m² as the electrode substrate, the impregnation areal weight was set at 0.4 times as the areal weight of the electrode substrate. As a result of the cross sectional structure evaluation, it could be confirmed that the structure of the microporous part (B) and large pore continuous to the inside of the electrode substrate in the through-plane direction further developed and the density of continuous microporous part (B) increased more than in Example 1, and as a result of evaluating fuel cell performance using this gas diffusion electrode substrate, as shown in Table 1, the anti-dry-out characteristic was improved, and the anti-flooding characteristic was greatly improved.

(Example 3)

A gas diffusion electrode substrate was obtained according to the methods described in <Preparation of Electrode Substrate>, <Formation of Precursor of Microporous Part (B)> and <Formation of Microporous Part (A)>. Here, as shown in Table 1, using the electrode substrate 1 with a thickness of 100 μm and an areal weight of 25 g/m² as the electrode substrate, the impregnation areal weight was set at 0.5 times as the areal weight of the electrode substrate. As a result of the cross sectional structure evaluation, the structure of the microporous part (B) and large pore continuous to the inside of the electrode substrate in the through-plane direction could be confirmed, and as a result of evaluating fuel cell performance using this gas diffusion electrode substrate, as shown in Table 1, the anti-flooding characteristic was improved without deterioration of anti-dry-out characteristic, as compared to the comparative examples, though not equal to Example 2.

(Example 4)

A gas diffusion electrode substrate was obtained according to the methods described in <Preparation of Electrode Substrate>, <Formation of Precursor of Microporous Part (B)> and <Formation of Microporous Part (A)>, except for setting the areal weight of the microporous part (A) at 10 g/m². Here, as shown in Table 1, using the electrode substrate 1 with a thickness of 100 μm and an areal weight of 25 g/m² as the electrode substrate, the impregnation areal weight was set at 0.4 times as the areal weight of the electrode substrate. Also, the thickness of the microporous part (A) was 20 μm. As a result of the cross sectional structure evaluation, the structure of the microporous part (B) and large pore continuous to the inside of the electrode substrate in the through-plane direction could be confirmed, and as a result of evaluating fuel cell performance using this gas diffusion electrode substrate, as shown in Table 1, the anti-dry-out characteristic was improved, and the anti-flooding characteristic was greatly improved, as compared to the comparative examples. This was because the effect that gas diffusivity and water removal performance in the microporous part (A) were improved and the effect of the improvement of water removal performance and gas diffusivity by the microporous part (B) continuous to the electrode substrate in the through-plane direction were combined so that both water removal performance and gas diffusivity could be satisfied in the whole gas diffusion electrode substrate even in a high current density region.

(Example 5)

A gas diffusion electrode substrate was obtained according to the methods described in <Preparation of Electrode Substrate>, <Formation of Precursor of Microporous Part (B)>and <Formation of Microporous Part (A)>, except for setting the areal weight of the microporous part (A) at 30 g/m². Here, as shown in Table 1, using the electrode substrate 1 with a thickness of 100 μm and an areal weight of 25 g/m² as the electrode substrate, the impregnation areal weight was set at 0.4 times as the areal weight of the electrode substrate. Also, the thickness of the microporous part (A) was 55 μm. As a result of the cross sectional structure evaluation, the structure of the microporous part (B) and large pore continuous to the inside of the electrode substrate in the through-plane direction could be confirmed, and as a result of evaluating fuel cell performance using this gas diffusion electrode substrate, as shown in Table 1, the anti-dry-out characteristic was improved, and the anti-flooding characteristic was improved, as compared to the comparative examples.

(Example 6)

A gas diffusion electrode substrate was obtained according to the methods described in <Preparation of Electrode Substrate>, <Formation of Precursor of Microporous Part (B)> and <Formation of Microporous Part (A) >, except for setting the areal weight of the microporous part (A) at 35 g/m². Here, as shown in Table 1, using the electrode substrate 1 with a thickness of 100 μm and an areal weight of 25 g/m² as the electrode substrate, the impregnation areal weight was set at 0.4 times as the areal weight of the electrode substrate. Also, the thickness of the microporous part (A) was 65 μm. As a result of the cross sectional structure evaluation, the structure of the microporous part (B) and large pore continuous to the inside of the electrode substrate in the through-plane direction could be confirmed, and as a result of evaluating fuel cell performance using this gas diffusion electrode substrate, as shown in Table 1, the anti-dry-out characteristic was improved, but the improvement in the anti-flooding characteristic was small, as compared to Comparative Example 2.

(Example 7)

A gas diffusion electrode substrate was obtained according to the methods described in <Preparation of Electrode Substrate> and <Formation of Microporous Part (A) >, except for immediately after coating a carbon coating solution having a composition shown in Table 1 on the electrode substrate 1 with a thickness of 100 μm so as to have an areal weight of 10 g/m² after sintering, applying an original pressure of 0.4 MPa on one surface of the electrode substrate at a slit width of 0.2 mm, and applying wind pressure by air blowing from a distance of 5 mm from the electrode substrate to cause deviation in the impregnation liquid impregnated into the electrode substrate, and the physical values shown in Table 1 were obtained. Consequently, as a result of evaluating fuel cell performance using this gas diffusion electrode substrate, the anti-dry-out characteristic was improved, and the anti-flooding characteristic was extremely greatly improved, as compared to Example 2.

This is considered to be because the microporous part (B) and large pore continuous to the electrode substrate in the through-plane direction was formed with good balance by pressurized air flow, and thus the gas diffusion electrode substrate had a structure in which both water removal performance and gas diffusivity were easily satisfied.

(Example 8)

A gas diffusion electrode substrate was obtained according to the methods described in <Preparation of Electrode Substrate>, <Formation of Precursor of Microporous Part (B)> and <Formation of Microporous Part (A)>, except for using the electrode substrate 2. Here, as shown in Table 2, using the electrode substrate 2 with a thickness of 180 μm and an areal weight of 45 g/m² as the electrode substrate, the impregnation areal weight was set at 0.4 times as the areal weight of the electrode substrate. As a result of the cross sectional structure evaluation, the structure of the microporous part (B) and large pore continuous to the inside of the electrode substrate in the through-plane direction could be confirmed, and as a result of evaluating fuel cell performance using this gas diffusion electrode substrate, as shown in Table 2, the anti-flooding characteristic was greatly improved without deterioration of anti-dry-out characteristic, as compared to the comparative examples.

(Examples 9 to 11)

A gas diffusion electrode substrate was obtained in the same manner as in Example 1, except in that "VGCF" of an aspect ratio of 50 was mixed to the carbon coating solution to have a composition shown in Table 2 in <Formation of Precursor of Microporous Part (B)>. Here, as shown in Table 2, using the electrode substrate 1 with a thickness of 100 μm and an areal weight of 25 g/m² as the electrode substrate, the impregnation areal weight was set at 0.4 times as the areal weight of the electrode substrate. As a result of the cross sectional structure evaluation, the structure of the microporous part (B) and large pore continuous to the inside of the electrode substrate in the through-plane direction could be confirmed, and as a result of evaluating fuel cell performance using this gas diffusion electrode substrate, as shown in Table 2, the anti-dry-out characteristic was improved, and the anti-flooding characteristic was greatly improved, as compared to the comparative examples. This is considered to be because the porosity of the microporous part (B) was larger than the porosity of the microporous part (A) by 5% or more, and thus water removal performance was improved. Since composition of the carbon based filler of high aspect ratio was optimal particularly in Example 10, the anti-flooding characteristic was extremely greatly improved.

(Example 12)

A gas diffusion electrode substrate was obtained in the same manner as in Example 1, except in that a multi-walled carbon nanotube (manufactured by Cheap Tubes Inc.) of an aspect ratio of 1300 was mixed to the carbon coating solution to have a composition shown in Table 2 in <Formation of Precursor of Microporous Part (B)>. Here, as shown in Table 2, using the electrode substrate 1 with a thickness of 100 μm and an areal weight of 25 g/m² as the electrode substrate, the impregnation areal weight was set at 0.4 times as the areal weight of the electrode substrate. As a result of the cross sectional structure evaluation, while the structure of the microporous part (B) and large pore continuous to the inside of the electrode substrate in the through-plane direction could be confirmed, the structure formation thereof was insufficient, as compared to Example 9. This is considered to be because the aspect ratio of the carbon based filler was large, and thus impregnation into the electrode substrate was insufficient. As a result of evaluating fuel cell performance using this gas diffusion electrode substrate, as shown in Table 2, the anti-dry-out characteristic was improved, and the anti-flooding characteristic was greatly improved, as compared to the comparative examples.

(Examples 13 to 15)

A gas diffusion electrode substrate was obtained in the same manner as in Example 1, except for controlling the loading amount of the resin component in both sides of the electrode substrate in <Impregnation of Resin Component>to change the surface roughness in both sides. Here, as shown in Table 2, using the electrode substrate 1 with a thickness of 100 μm and an areal weight of 25 g/m² as the electrode substrate, the impregnation areal weight was set at 0.4 times as the areal weight of the electrode substrate. As a result of the cross sectional structure evaluation, the developed structure of the microporous part (B) and large pore continuous to the inside of the electrode substrate in the through-plane direction could be confirmed, and further, the microporous part (B) was much present in the side of the microporous part (A), and many pores were confirmed in the opposite side. As a result of evaluating fuel cell performance using this gas diffusion electrode substrate, as shown in Table 2, the anti-dry-out characteristic was improved, and the anti-flooding characteristic was greatly improved, as compared to the comparative examples. Since the difference in the surface roughness between both sides of the electrode substrate was optimal particularly in Example 14, the optimal internal structure of the electrode substrate was obtained, thus the fuel cell performance was also extremely greatly improved.

(Examples 16 to 19)

A gas diffusion electrode substrate was obtained in the same manner as in Example 1, except for using a FEP resin in place of the PTFE resin as the water repellent agent of the carbon coating solution in <Formation of Precursor of Microporous Part (B)>. Here, as shown in Table 2, using the electrode substrate 1 with a thickness of 100 μm and an areal weight of 25 g/m² as the electrode substrate, the impregnation areal weight was set at 0.4 times as the areal weight of the electrode substrate. As a result of the cross sectional structure evaluation, the structure of the microporous part (B) and large pore continuous to the inside of the electrode substrate in the through-plane direction could be confirmed. As a result of evaluating fuel cell performance using this gas diffusion electrode substrate, as shown in Table 2, the anti-dry-out characteristic was greatly improved, and the anti-flooding characteristic was improved in Example 16, as compared to the comparative examples. Particularly in Example 19, enlargement of the pore of the microporous part (B) was combined, whereby both good water removal performance and gas diffusivity could be satisfied, the anti-dry-out characteristic was also greatly improved, and the anti-flooding characteristic was extremely greatly improved.

(Comparative Examples 1 to 4)

A gas diffusion electrode substrate having a planar microporous part in the catalyst side of the electrode substrate, as shown in Table 3, was obtained in the methods described in <Preparation of Electrode Substrate>and <Microporous Part>. As a result of evaluating fuel cell performance of this gas diffusion electrode substrate, the anti-flooding and anti-dry-out characteristics were insufficient, as shown in Table 3.

The cause of insufficient anti-flooding and anti-dry-out characteristics in Comparative Example 1 is considered that the viscosity of the coating liquid of the coated precursor of the microporous part was high, and a part functioning as the microporous part (B) was not present in the inside of the electrode substrate, thus many pores were present in the inside of the electrode substrate and water was retained, whereby gas diffusivity was insufficient.

The cause of insufficient anti-flooding and anti-dry-out characteristics in Comparative Example 2 is considered that the structure was not controlled by an air flow after coating on the microporous part (B) impregnated in the inside of the electrode substrate, and a continuous structure was not formed in the through-plane direction of the microporous part, thus many pores were present in the inside of the electrode substrate and water was retained, whereby gas diffusivity was insufficient.

As described above, in order to obtain the structure of the microporous part (B) and large pore continuous in the inside of the electrode substrate in the present invention, it can be understood that target performance cannot be obtained unless the viscosity of the impregnation coating liquid, the areal weight of the microporous part (B) with respect to the electrode substrate to be impregnated, and the thickness of the electrode substrate satisfy the necessary conditions.

In addition, the cause of insufficient anti-flooding and anti-dry-out characteristics in Comparative Example 3 is considered that the areal weight of the microporous part (B) exceeded 0.55 times as the areal weight of the electrode substrate, the impregnation rate by the microporous part of pores of the electrode substrate was increased, gas diffusivity was deteriorated, and a continuous pore was unlikely to be formed, thus water removal performance was also deteriorated.

Moreover, in Comparative Example 4, while a gas diffusion electrode layer was formed using the electrode substrate 3, it was difficult to impregnate the microporous part (B) in the inside of the electrode substrate since the electrode substrate was thick, thus the microporous part (B) continuous in the through-plane direction could not be formed. It is considered that both water removal performance and gas diffusivity could not be satisfied for the above reasons, and thus fuel cell performance was deteriorated.

[Table 1]
[Table 2]
[Table 3]

In Tables 1 to 3, the contents are described in part(s) by mass.

DESCRIPTION OF REFERENCE SIGNS

1: Electrode substrate
2: Microporous part (A)
3: Microporous part (B)
4: Thickness of electrode substrate
5: ¾ of thickness of electrode substrate
6: Path length of microporous part (B)
7: Carbon fiber of electrode substrate

The invention claimed is:

1. A gas diffusion electrode substrate that is used in a fuel cell and is constituted by an electrode substrate and microporous parts, in which a microporous part (A) is formed on one surface of the electrode substrate, and a microporous part (B) is formed in a part of the inside of the electrode substrate, wherein the electrode substrate has pores;
wherein the microporous part (B) is present in a form connecting to the microporous part (A),
wherein the gas diffusion electrode substrate has a part in which the microporous part (B) is continuously present in a through-plane cross section of said electrode substrate from the electrode substrate surface on the side on which the microporous part (A) is formed to a position near the electrode substrate surface on the opposite side, and a part in which the pores of said electrode substrate are continuously distributed from the electrode substrate surface on the side on which the microporous part (A) is formed to the electrode substrate surface on the opposite side.

2. The gas diffusion electrode substrate according to claim 1, wherein the microporous part (B) is impregnated in the part of the inside of the electrode substrate.

3. The gas diffusion electrode substrate according to claim 2, wherein the microporous part (B) has an areal weight within the range of 0.25 times or more and 0.55 times or less as the areal weight of the electrode substrate.

4. The gas diffusion electrode substrate according claim 2, wherein the microporous part (B) comprises a carbon based filler having an aspect ratio of 30 or more and 5000 or less.

5. The gas diffusion electrode substrate according to claim 2, wherein, in the cross section of the electrode substrate, the density of microporous part (B) is 1 part/mm or more.

6. The gas diffusion electrode substrate according to claim 1, wherein the microporous part (B) has an areal weight within the range of 0.25 times or more and 0.55 times or less as the areal weight of the electrode substrate.

7. The gas diffusion electrode substrate according to claim 6, wherein the microporous part (B) comprises a carbon based filler having an aspect ratio of 30 or more and 5000 or less.

8. The gas diffusion electrode substrate according to claim 1, wherein the microporous part (B) comprises a carbon based filler having an aspect ratio of 30 or more and 5000 or less.

9. The gas diffusion electrode substrate according to claim 8, wherein the carbon based filler having an aspect ratio of 30 or more and 5000 or less is a fibrous carbon having an aspect ratio of 30 or more and 5000 or less.

10. The gas diffusion electrode substrate according to claim 1, wherein, in the cross section of the electrode substrate, the density of the part in which the microporous part (B) is 1 part/mm or more.

11. The gas diffusion electrode substrate according to claim 1, wherein, in the cross section of the electrode substrate, the density of the part in which the pores are continuously distributed is 1 part/mm or more.

12. The gas diffusion electrode substrate according to claim 1, the microporous part (B) is impregnated having a width of 10 μm or more and having a depth of ¾ or more of the thickness of the electrode substrate.

13. The gas diffusion electrode substrate according to claim 1, wherein the thickness of the microporous part (A) is 10 μm or more and 60 μm or less, and the thickness of the electrode substrate is 50 μm or more and 190 μm or less.

14. The gas diffusion electrode substrate according to claim 1, wherein the electrode substrate has, as compared to the surface roughness on the side where the microporous part (A) is formed, the surface roughness on the opposite side is larger with a difference of 1 μm or more and 5 μm or less.

15. The gas diffusion electrode substrate according to claim 1, wherein the microporous part (B) comprises a water repellent agent having a melting point of 200° C. or more and 320° C. or less.

16. The gas diffusion electrode substrate according to claim 1, wherein the microporous part (B) comprises a water repellent agent and a carbon based filler, and the mass ratio of the water repellent agent is 5% by mass or more and 50% by mass or less based on the carbon based filler.

17. The gas diffusion electrode substrate according to claim 1, wherein the microporous part (B) has a porosity of 60% or more and 90% or less.

18. The gas diffusion electrode substrate according to claim 1, wherein the porosity of the microporous part (B) is larger than the porosity of the microporous part (A) by 5% or more.

19. A membrane electrode assembly having catalyst layers on both sides of an electrolyte membrane, and further having the gas diffusion electrode substrate as defined in claim 1 on the outer side of the catalyst layers.

20. A fuel cell having bipolar plates on both sides of the membrane electrode assembly as defined in claim 19.

* * * * *